United States Patent [19]

Dhondt

[11] 4,295,773
[45] Oct. 20, 1981

[54] APPARATUS AND METHOD FOR INTRODUCING SOLIDS INTO A SOLIDS UPFLOW VESSEL

[75] Inventor: Roland O. Dhondt, Long Beach, Calif.

[73] Assignee: Union Oil Company of California, Brea, Calif.

[21] Appl. No.: 92,688

[22] Filed: Nov. 9, 1979

[51] Int. Cl.³ .............................................. C10B 31/02
[52] U.S. Cl. .................................. 414/187; 46/86 A; 202/262; 414/198
[58] Field of Search ............... 414/172, 187, 198, 786; 202/262; 193/2 R; 48/86 A; 201/41

[56] References Cited

U.S. PATENT DOCUMENTS

| 3,00,385 | 6/1884 | Mathieu | 202/262 X |
| 1,866,730 | 7/1932 | Sperr | 202/262 |
| 2,501,153 | 3/1950 | Berg | 414/198 X |
| 2,627,455 | 2/1953 | Berg | 202/262 X |
| 2,640,014 | 5/1953 | Berg | 202/262 X |
| 2,783,898 | 3/1957 | Ardern et al. | 193/2 R |
| 2,871,170 | 1/1959 | Bewley et al. | 202/262 X |
| 2,875,137 | 2/1959 | Lieffers et al. | 414/198 X |
| 2,895,884 | 7/1959 | Switzer | 414/187X |
| 3,621,774 | 11/1971 | Dedio et al. | 414/198 |
| 4,033,467 | 7/1977 | Bewley et al. | 414/187 |
| 4,037,736 | 7/1977 | Pownall et al. | 414/198 X |

Primary Examiner—Robert G. Sheridan
Attorney, Agent, or Firm—Dean Sandford; Daniel R. Farrell

[57] ABSTRACT

A solids feeder and method for transporting particulate solids from an elevated solids feed reservoir and introducing the solids upwardly into the bottom of a solids upflow vessel. The feeder includes a stationary feed cylinder axially aligned with a bottom solids inlet of the upflow vessel and fitted with a vertically reciprocatable piston which alternately (1) retracts to allow the feed cylinder to receive solids from the feed reservoir by gravity flow through a feed chute and (2) extends to displace the solids upwardly into the upflow vessel. Horizontally reciprocatable slide plates prevent backflow of solids during the filling of the feed cylinder.

24 Claims, 12 Drawing Figures

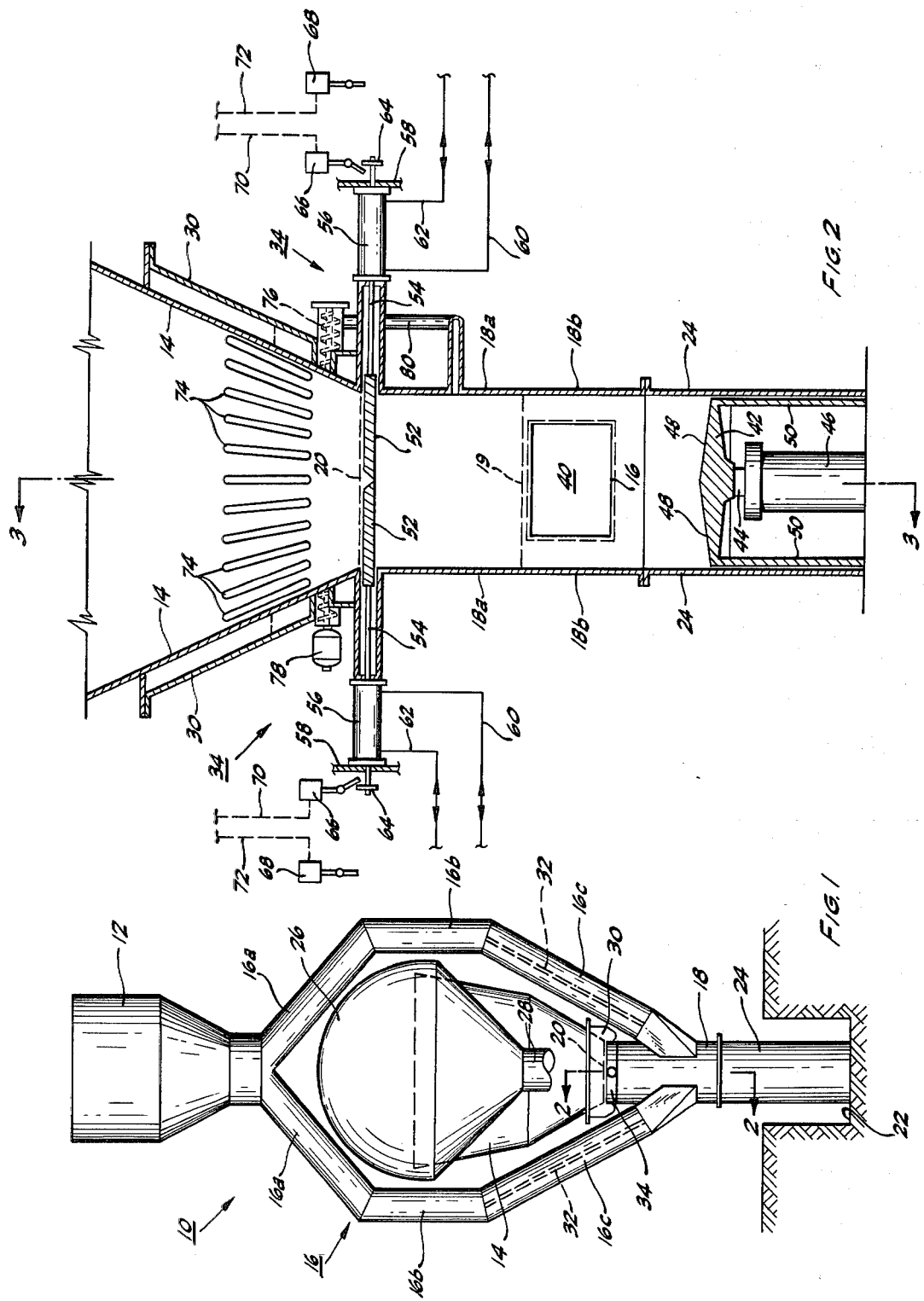

APPARATUS AND METHOD FOR INTRODUCING SOLIDS INTO A SOLIDS UPFLOW VESSEL

BACKGROUND OF THE INVENTION

1. Field of the Invention

This invention relates to solids handling, and more particularly to apparatus and methods for introducing particulate solids into the bottom of a solids upflow vessel, such as a vertical solids upflow retort used for heat treating oil-producing or oil-containing solids to recover oil and/or gas therefrom.

2. Description of the Prior Art

The problem of transporting particulate solids from a solids feed supply, such as a bin or reservoir of the particulate solids, into the bottom of a solids upflow vessel has been encountered in diverse operations, exemplary of which are the feeding of oil-producing and/or gas-producing solids, such as oil shale, tar sand, bituminous coal, oil-saturated diatomaceous earth, and the like into the bottom of a vertical solids upflow retort for treating the solids to recover oil and/or gas therefrom, and the production of synthesis gas by the reaction of gas containing steam with carbonaceous solids such as coal, coke, and the like.

In these operations, difficulties are encountered in the design and operation of mechanical feed systems because of the nature of the particulate solids being transported, typical solids being abrasive and difficult to handle on the one hand and on the other being friable and tending to abrade, thereby forming large quantities of undesirable fine particles. Feeder devices used to introduce solids into the bottom of an upflow solids bed must move the solids against the weight of the solids bed. Also, it is often the case that the solids must be transported from a storage bin at atmospheric pressure into a solids upflow vessel which operates at a superatmospheric pressure. These factors, coupled with the often gigantic size of the equipment required to obtain the desired solids feed capacity, and the fact that in some applications the feeder device must operate at elevated temperatures and in contact with liquids and/or gases produced in the solids treating process, produce difficult design problems involving large and complex mechanical forces and complicated mechanical loadings that must be adequately provided for in the feeder design.

A number of different apparatus and methods for introducing particulate solids into the bottom of a solids upflow vessel have been proposed. U.S. Pat. Nos. 2,501,153 to Berg; 2,640,014 to Berg, 2,875,137 to Lieffers et al. and 2,895,884 to Switzer disclose solids feeding apparatus and methods in which particulate oil shale is introduced upwardly into the bottom of a vertical retort by means of a piston reciprocating in a feed cylinder that is oscillated between an outlet of a shale feed reservoir and the bottom solids inlet of the retort. While such oscillating feeder apparatus can be satisfactorily employed to introduce particulate solids into a solids upflow vessel, a number of problems and limitations are encountered when using such feeders in large capacity commercial units, such as oil shale retorts having capacities on the order of 10,000 tons of oil shale per day or more. Specifically, oscillating feeder apparatus having these capacities are extremely large and require substantial clearance between the supporting foundation and the bottom of the retort, increasing the height and cost of the retort structure. The clearance between the arcuate seal plates oscillated with the feed cylinder, and the bottoms of the feed reservoir and retort must be extremely small, such as about 0.030 inch or less. Machining of these parts to such close tolerances is very difficult and at best is very costly.

U.S. Pat. No. 4,033,467 to Bewley et al. and 4,037,736 to Pownall et al. disclose solids feeding apparatus and methods in which particulate solids are introduced upwardly into the bottom of a vertical solids upflow vessel by means of twin pistons reciprocating in twin feed cylinders that are rotated and reciprocated, respectively, between one or more solids feed chutes and the bottom solids inlet of the solids upflow vessel. While such feeders can be satisfactorily employed to introduce particulate solids into a solids upflow vessel at very high rates, the mechanical complexity and enormous size of these feeders results in a very high cost of construction and relatively high operating expense.

U.S. Pat. No. 2,871,170 to Bewley et al. discloses a solids feeding apparatus and method in which particulate solids are introduced upwardly into the bottom of a vertical solids upflow vessel by means of a piston reciprocating in a stationary feed cylinder that is axially aligned with the bottom solids inlet of the solids upflow vessel. Twin horizontally reciprocatable scoops forceably introduce additional solids into the feed cylinder while slide plates prevent backflow of solids from the retort. The volume of solids introduced into the feed cylinder by the scoops must necessarily be carefully controlled in this apparatus to avoid overfilling the feed cylinder and therefore a relatively elaborate solids flow control device is provided to regulate the solids introduction rate. While this apparatus has the advantage of having stationary hydraulic actuating cylinders, the necessity of having the solids flow control device on the feed chute is undesirable from a practical standpoint in a large scale commercial plant. Accordingly a need exists for a mechanically simple and effective apparatus and method for introducing particulate solids upwardly into a solids upflow vessel at high rates.

Accordingly, a primary object of this invention is to provide an improved apparatus and method for introducing particulate solids upwardly into the bottom of a solids upflow vessel.

Another object of this invention is to provide a mechanically simple and effective solids feeding apparatus and method having lower construction and operating costs than the prior art apparatus and methods.

Yet another object of this invention is to provide a solids feeding apparatus in which the hydraulic cylinders and hydraulic lines are stationary and the number of moving parts is minimized so as to reduce the amount of maintenance required.

A further object of this invention is to provide a solids feeding apparatus in which the moving parts thereof are relatively easily accessible for maintenance and repair.

A still further object of this invention is to provide a solids feeding apparatus and method in which the forces applied to the particulate solids being fed are reduced to a practical minimum.

Additional objects, advantages and features of the invention will become apparent to those skilled in the art from the following description when taken in conjunction with the accompanying drawings.

SUMMARY OF THE INVENTION

Briefly, the invention provides an apparatus and method for transporting particulate solids from an elevated solids feed reservoir and introducing the solids upwardly through a bottom solids inlet of a solids upflow vessel. The apparatus includes (1) a stationary feed cylinder coaxially aligned below the solids inlet of the upflow vessel, (2) one or more feed chutes adapted to transport particulate solids by mechanically unassisted gravity flow from the feed reservoir to the feed cylinder, (3) a vertically reciprocatable piston adapted to displace solids from the feed cylinder into the upflow vessel and (4) a device for preventing the backflow of solids from the upflow vessel during the filling of the feed cylinder.

In a preferred embodiment of the apparatus of this invention, one or more horizontally reciprocatable slide plates are adapted to prevent solids backflow from the upflow vessel and a motion sequence control device is adapted to synchronize the movements of the slide plates with the movement of the feeder piston. In another preferred embodiment, the inclined portion of the feed chute adjacent the feed cylinder is provided with a longitudinally disposed baffle adapted to reduce the gravity segregation of solids fines from the larger particulate solids.

In the method of this invention, particulate solids are transported by mechanically unassisted gravity flow from the elevated feed reservoir into the feed cylinder, the piston is extended to displace the solids upwardly into the upflow vessel, the backflow prevention device is activated to prohibit backflow of solids from the upflow vessel, and the piston is thereafter retracted to allow the introduction of additional particulate solids into the feed cylinder by gravity flow from the feed reservoir. In a preferred embodiment of the method of this invention, after full extension of the piston and before activation of the backflow prevention device the piston is retracted a preselected distance so as to relax the bed of solids in the solids upflow vessel. This bed relaxation step results in a reduction in the force required to activate the backflow prevention device, a reduced solids loading pressure on the backflow prevention device and a reduction in the maximum piston-to-solids pressure during the charging stroke of the piston.

The apparatus and method of this invention allow the use of stationary hydraulic cylinders and hydraulic lines thereby reducing the associated installation and maintenance costs. The apparatus allows the very large forces generated during the charging stroke of the piston to be directly supported by the underlying foundation rather than being supported by the foundation indirectly through a trunnion, wheeled carriage or the like. The apparatus and method of this invention are relatively simple mechanically thereby reducing the costs of construction, maintenance and operation of the solids feeder.

BRIEF DESCRIPTION OF THE DRAWINGS

The invention will be more readily understood by reference to the drawings, wherein like numerals refer to like elements, and in which:

FIG. 1 is an elevational view of one embodiment of the apparatus of the invention;

FIG. 2 is a partial elevational view in cross-section taken along line 2—2 of FIG. 1, illustrating preferred embodiments of the piston and the backflow prevention device of this invention;

DETAILED DESCRIPTION OF THE INVENTION

Figure 3:
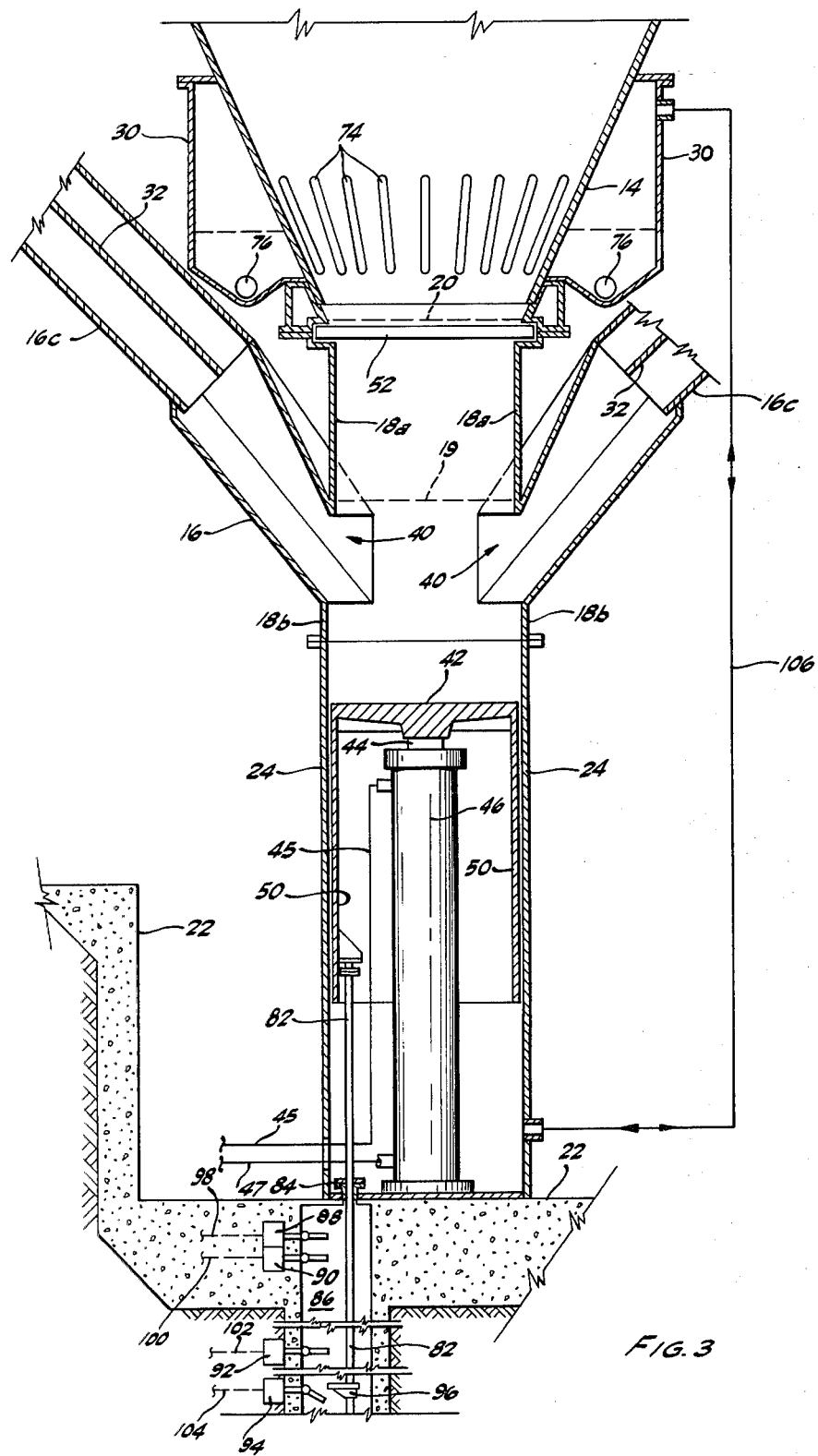
FIG. 3 is a partial elevational view in cross-section taken along line 3—3 of FIG. 2, illustrating preferred embodiments of the feed chutes and portions of the motion sequence control device of this invention.

The apparatus and method of this invention are useful in a wide variety of solids handling systems for introducing particulate solids upwardly into the bottom of a solids upflow vessel, and are particularly useful for introducing particulate oil shale or other oil-producing or oil-bearing solids upwardly into a vertical solids upflow retort for heat treatment of the solids. While the invention will be described with respect to such a retort, the invention is not so limited.

Referring to FIG. 1, a preferred embodiment of the apparatus of this invention, shown generally as 10, includes elevated solids feed reservoir 12 supported above solids upflow vessel 14 and communicating through solids feed chutes, shown generally as 16, with feed cylinder 18. Upflow vessel 14 is a vertical frustoconical retort vessel having bottom solids inlet 20. Feed cylinder 18 is below and coaxially aligned with solids inlet 20 and vessel 14 and is supported above foundation 22. Feed cylinder 18 is removably and fluid-tightly connected to and in coaxial alignment with piston casing 24. Dome 26 fluid-tightly encloses the top of upflow vessel 14 and is adapted to conduct solids discharged from the top of vessel 14 downwardly through one or more solids discharge chutes 28 to a desired discharge site, not shown. Disengaging vessel 30 fluid-tightly encloses the bottom of vessel 14 and the top of feed cylinder 18. Backflow prevention device 34 is disposed between solids inlet 20 and feed cylinder 18, and is adapted to prohibit backflow of solids from vessel 14 during the filling of feed cylinder 18.

Feed chutes 16 include upper inclined sections 16a, vertical sections 16b and lower inclined sections 16c, all of which are relatively large diameter conduits adapted to transport particulate solids by mechanically unassisted gravity flow from feed reservoir 12 downwardly into feed cylinder 18. The term "mechanically unassisted gravity flow" is used herein to define the flow of solids under natural gravitational forces substantially free of any mechanically operated solids transporting equipment, such as occurs through an unrestricted vertical or inclined conduit which is free from mechanical devices such as hydraulic scoops, pistons and the like.

Feed chutes 16 can be unrestricted conduits of any desired shape, such as a conduit having a circular, rectangular or other polygonal cross-section. When the apparatus is used to transport particulate solids having a "fines" fraction of reduced particle size, it is preferred that the lower inclined sections of the feed chutes, such as sections 16c, be provided with a device to reduce the natural gravitational segregation of the fines fraction from the larger solids. Preferred fines segregation prevention devices are baffles 32 longitudinally disposed within sections 16c so as to divide sections 16c into an upper solids flowpath and a lower solids flowpath. In this manner the fines in the upper solids flow path of section 16c are prevented from settling past baffle 32 to the bottom flow path of section 16c.

Referring to FIGS. 2 and 3, feed cylinder 18 includes upper substantially solids-tight cylindrical section 18a, and lower cylindrical section 18b having solids inlet opening 40 communicating with the solids outlet of feed chute 16. Dashed line 19 indicates the bottom of section 18a and the top of section 18b. Preferably the volume of section 18a is approximately equal to the combined volume of section 18b and that portion of piston casing 24 above piston 42 when piston 42 is fully retracted. Piston 42 is movably mounted in piston casing 24 and is adapted to be vertically reciprocated along the axis of feed cylinder 18 by means of shaft 44 driven by hydraulic cylinder 46. As best seen in FIG. 3, the upper and lower ends of hydraulic cylinder 46 are hydraulically connected via conduits 45 and 47, respectively, to a hydraulic system described more fully hereinbelow. A conduit 106 allows fluid displaced during the reciprocation of piston 42 to flow between piston casing 24 and disengaging vessel 30.

As best seen in FIG. 2, the top surface of piston 42 preferably has oppositely inclined planar surfaces 48 extending from the center of piston 42 downwardly and outwardly to the edge of piston 42, i.e., the top surface of piston 42 is shaped somewhat like the top of a chisel with a central ridge running across the diameter of piston 42 perpendicular to the line of reciprocation of slide plates 52 and planar surfaces 48 slope downwardly and outwardly from the central ridge. Preferably the incline angle of planar surfaces 48 is selected such that the volume of the chisel-like top of piston 42 is approximately equal to the volume of feed cylinder 18 occupied by slide plates 52 when fully extended.

Preferably cylindrical skirt element 50 is attached around the perimeter of piston 42 and extends downwardly from piston 42. Skirt element 50 is adapted to be automatically positioned in sealing relationship with solids inlet openings 40 when piston 42 is extended to displace solids from feed cylinder 18 upwardly into vessel 14.

As best seen in FIG. 2, backflow prevention device 34 includes slide plates 52 movably mounted between bottom solids inlet 20 and feed cylinder 18 and adapted to be horizontally reciprocated by means of shafts 54 driven by hydraulic cylinders 56. Slide plates 52 are reciprocatable between a sealing position in which slide plates 52 traverse solids inlet 20 so as to prohibit solids flow therethrough and an open position to which slide plates 52 are retracted to allow unrestricted solids flow through solids inlet 20. Preferably the leading edges of slide plates 52 are upwardly tapered so as to uplift any particulate solids contacted by the leading edges during the closing of slide plates 52. The outboard end of hydraulic cylinders 56 are mechanically coupled to structural supports 58, and the inboard and outboard ends of hydraulic cylinders 56 are hydraulically connected to the hydraulic system described more fully hereinbelow by means of conduits 60 and 62, respectively.

Position indicating rods 64 are connected to shafts 54 so as to be horizontally reciprocated with slide plates 52. The tail portions of rods 64 extend beyond supports 58 and are adapted to trigger inboard electro-mechanical limit switches 66 when slide plates 52 are in the sealing position and to trigger outboard electro-mechanical limit switches 68 when slide plates 52 are in the open position. The electrical signals from limit switches 66 and 68 are conducted through electrical conductors 70 and 72, respectively, to a motion sequence control device described below.

Solids upflow vessel 14 is provided with a plurality of elongated slots 74 in the wall of vessel 14 adjacent to the interior of disengaging vessel 30. Slots 74 are dimensioned to allow fluid-communication but substantially prohibit solids flow between solids upflow vessel 14 and disengaging vessel 30. Typically the passage of a minor portion of relatively fine solids through slots 74 into vessel 30 cannot be avoided. To remove such fines, auger 76 driven by motor 78 is provided at the bottom of disengaging vessel 30 to transport the fines to discharge conduit 80 for reintroduction into feed cylinder 18. Alternatively, the fines can be transported to a disposal site, not shown, after appropriate cleaning to remove oil therefrom.

As best seen in FIG. 3, piston position indicating rod 82 is fixedly coupled to skirt element 50 so as to be vertically reciprocatable with piston 42. Rod 82 extends downwardly from skirt element 50 through stuffing box 84 into well 86 which contains electro-mechanical limit switches 88, 90, 92 and 94 mounted is preselected positions in well 86. Trip element 96 attached to the lower end of rod 82 is adapted to trigger switches 88, 90, 92 and 94, respectively, when piston 42 is in the corresponding one of four preselected piston positions. The electrical signals from switches 88, 90, 92 and 94 are conducted through electrical conductors 98, 100, 102 and 104, respectively, to the motion sequence control device described below.

Figure 4:
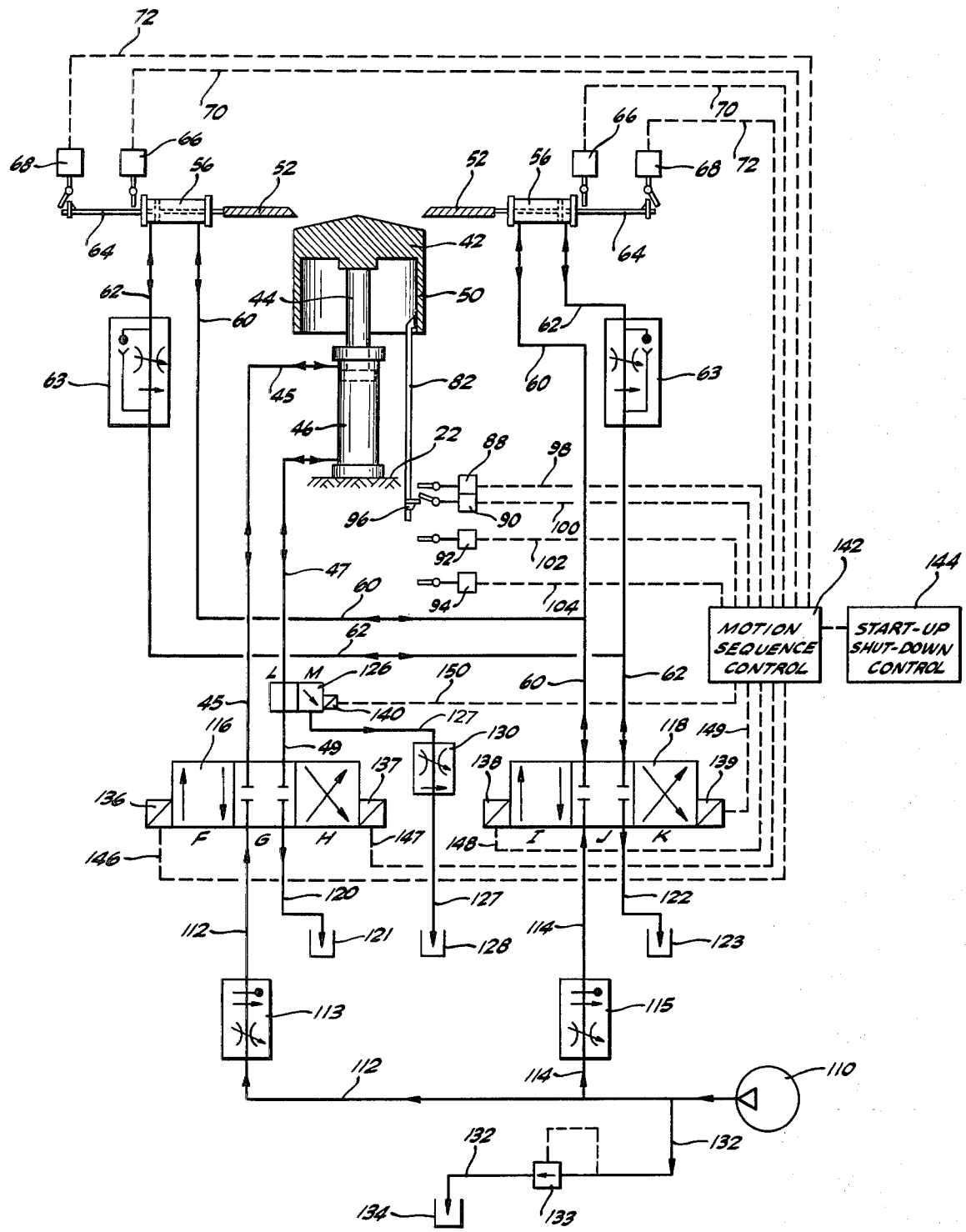
FIG. 4 is a schematic diagram illustrating a preferred embodiment of the hydraulic system and the motion sequence control system of this invention.

A preferred embodiment of a hydraulic system for providing the power to vertically reciprocate piston 42 and to horizontally reciprocate slide plates 52 is shown in FIG. 4. The hydraulic system includes pump 110 which discharges pressurized hydraulic fluid through conduits 112 and 114 to multiported solenoid valves 116 and 118, respectively. Pressure and temperature compensated flow control valves 113 and 115 control the rate of flow through conduits 112 and 114, respectively. Solenoid valve 116 is connected to the upper end of double-acting hydraulic cylinder 46 by conduit 45 and is connected to the lower end of hydraulic cylinder 46 by conduits 47 and 49. Solenoid valve 118 is connected to the inboard ends of double-acting hydraulic cylinders 56 by conduits 60 and to the outboard ends of hydraulic cylinders 56 by conduits 62. Pressure compensated flow control valves 63 control the rate of flow through conduits 62. Solenoid valves 116 and 118 are also connected by conduits 120 and 122 to hydraulic fluid sumps 121 and 123, respectively. Optionally, multiport solenoid valve 126 is connected (1) by conduit 47 to the lower end of hydraulic cylinder 46, (2) by conduit 49 to solenoid valve 116 and (3) by conduit 127 to hydraulic fluid sump 128. Pressure compensated flow control valve 130 controls the rate of flow through conduit 127 to sump 128. Relief valve 133 associated with conduit 132 and sump 134 serves to limit the output pressure of pump 110 to less than a preselected maximum pressure. While sumps 121, 123, 128 and 134 have been illustrated separately, it is understood of course that conventionally all the fluid sumps will be interconnected to form a hydraulic fluid reservoir from which pump 110 draws hydraulic fluid.

Solenoid valves 116 and 118 are multiported solenoid valves capable of simultaneously receiving hydraulic fluid from two conduits and discharging hydraulic fluid to two other conduits, i.e., a total of four fluid conduit connections to each valve. Each of valves 116 and 118 has an internal port mechanism capable of axial movement into one of three operating positions identified as positions F, G and H for valve 116 and positions I, J and K for valve 118. As is conventional, the internal port mechanism is axially shifted in the valve body by means of hydraulic cylinders controlled by solenoid drivers 136 and 137 on valve 116 and solenoid drivers 138 and 139 on valve 118. Similarly valve 126 has three ports and can be switched between positions L and M by means of solenoid driver 140 to connect conduit 47 to either conduit 49 (position L) or conduit 127 (position M).

When solenoid valve 116 is in position F, pressurized hydraulic fluid flows from pump 110 through conduits 112 and 45 to the upper end of hydraulic cylinder 46, while hydraulic fluid simultaneously is displaced from the lower end of hydraulic cylinder 46 either through conduits 47, 49 and 120 to sump 121 (if valve 126 is in position L) or, alternatively, through conduits 47 and 127 to sump 128 (when valve 126 is in position M). Accordingly when valve 116 is in position F piston 42 will be retracted. When solenoid valve 116 is in position G, no flow of hydraulic fluid to or from hydraulic cylinder 46 occurs and therefore piston 42 is stationary. When solenoid valve 116 is in position H, pressurized hydraulic fluid flows from pump 110 through conduits 112, 49 and 47 into the lower end of hydraulic cylinder 46 while hydraulic fluid simultaneously is displaced from the upper end of cylinder 46 through conduits 45 and 120 to sump 121, thereby extending piston 42.

When solenoid valve 118 is in position I, pressurized hydraulic fluid flows from pump 110 through conduits 114 and 60 into the inboard ends of hydraulic cylinders 56, while hydraulic fluid is simultaneously displaced from the outboard ends of cylinder 56 through conduits 62 and 122 to sump 123, thereby retracting slide plates 52. When solenoid valve 118 is in position J, no flow of hydraulic fluid to or from hydraulic cylinders 56 occurs and therefore slide plates 52 are stationary. When solenoid valve 118 is in position K, pressurized hydraulic fluid flows from pump 110 through conduits 114 and 62 into the outboard ends of hydraulic cylinders 56, while hydraulic fluid is simultaneously displaced from the inboard ends of cylinders 56 through conduits 60 and 122 to sump 123, thereby extending slide plates 52.

Also shown in FIG. 4 is a preferred embodiment of a motion sequence control system for selectively controlling the switching of solenoid valves 116, 118 and 126 so as to synchronize the movements of piston 42 and slide plates 52. The positions of slide plates 52 are detected by limit switches 66 and 68 and communicated by electrical conductors 70 and 72, respectively, to motion sequence controller 142. Similarly the position of piston 42 is detected by limit switches 88, 90, 92 and 94 and communicated by electrical conductors 98, 100, 102 and 104, respectively, to motion sequence controller 142. The exact locations of limit switches 88, 90, 92 and 94 are matters of choice depending upon, inter alia, the desired stroke length of piston 42, whether or not a bed relaxation step is to be employed and the desired position of piston 42 when fully extended. Such locations will be apparent to those skilled in the art from the following description. Start-up, shut-down controller 144 also receives the electrical signals indicative of the positions of slide plates 52 and piston 42. The output of controller 144 is connected to controller 142, and the output of controller 142 is communicated to solenoid drivers 136, 137, 138, 139 and 140 by means of electrical conductors 146, 147, 148, 149 and 150, respectively.

The operation of the apparatus of this invention and the operating sequence of the preferred embodiment of the motion sequence control and hydraulic systems illustrated in FIG. 4 can best be described in combination with reference to the preferred embodiment of the method of this invention illustrated in FIGS. 5A through 5H. The starting position of the feeder cycle, illustrated in the orthoginal views of FIGS. 5A and 5H, has slide plates 52 fully extended to prohibit backflow of solids from vessel 14, and piston 42 fully retracted so that the top of the piston 42 is at the position indicated as piston position A. In this starting position, valves 116, 118 and 126 are in valve positions G, J and L, respectively, and no flow of hydraulic fluid occurs. A fresh charge of particulate solids will have flowed by gravity flow through feed chutes 16 into feed cylinder 18 as piston 42 was retracted to piston position A in the previous feeder cycle. Upon reaching piston position A, limit switch 94 is tripped. In response to the signal from switch 94, motion sequence controller 142, after a preselected time delay, energizes solenoid drivers 136 and 137 to switch solenoid valve 116 to valve position H. As a result, pressurized hydraulic fluid is introduced through conduits 112, 49 and 47 into the lower end of hydraulic cylinder 46 thereby extending piston 42 until the top surface of piston 42 is in the position indicated in FIG. 5B as piston position B.

Figure 5A:
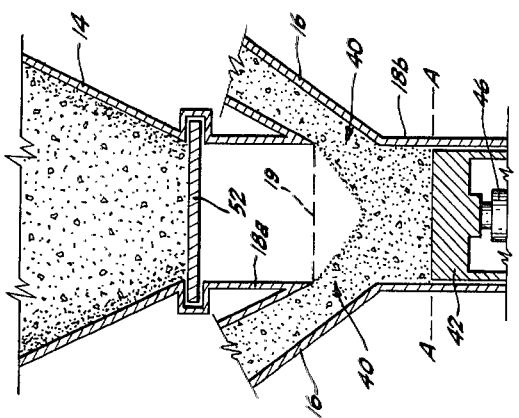
FIGS. 5A through 5D and FIGS. 5E through 5H are orthogonal, partial elevational views in cross-section of the apparatus of this invention illustrating the steps of a preferred embodiment of the method of this invention.

When piston 42 reaches piston position B, limit switch 92 is tripped and, in response to the signal from switch 92, motion sequence controller 142 deenergizes solenoid drivers 136 and 137 so as to return solenoid valve 116 to valve position G, and simultaneously energizes solenoid drivers 138 and 139 to switch solenoid valve 118 from valve position J to valve position I. As a result, piston 42 remains stationary in piston position B and slide plates 52 are retracted so as to communicate feed cylinder 18 with vessel 14, as shown in FIG. 5C.

When slide plates 52 are fully retracted, limit switches 68 are tripped and, in response to the signals from switches 68, motion sequence controller 142 deenergizes solenoid drivers 138 and 139 so as to return solenoid valve 118 to valve position J, and simultaneously energizes solenoid drivers 136 and 137 to switch solenoid valve 116 to valve position H. As a result, slide plates 52 remain stationary in the fully retracted positions and piston 42 is fully extended. In one embodiment of the method of this invention, piston 42 is extended until its top surface is in the position indicated as piston position E in FIG. 5D, i.e., that position in which the top of piston 42 is substantially flush with the top of feed cylinder 18 and just below the bottom of slide plates 52. However, in the preferred first embodiment illustrated in FIGS. 5D and 5E, piston 42 is extended until the top surface of piston 42 is in the position indicated as piston position C, i.e., that position in which the top surface of piston 42 is extended beyond the top of feed cylinder 18. As best seen in FIG. 5D, piston position C is that position in which the top of piston 42 is above the top of slide plates 52, indicated by dashed line D, and within an expanding inlet section of vessel 14. FIGS. 5D and 5E are orthogonal views of the apparatus of this invention illustrating the same piston position.

In this first embodiment, as piston 42 is fully extended to piston position C, limit switch 88 is tripped and, in response to the signal from switch 88, motion sequence controller 142 simultaneously energizes solenoid drivers 136 and 137 to switch solenoid valve 116 to valve position F, and energizes solenoid driver 140 to switch solenoid valve 126 to valve position M. As a result, pressurized hydraulic fluid is introduced through conduits 112 and 45 into the upper end of hydraulic cylinder 46 while hydraulic fluid is displaced from the lower end of cylinder 46 through conduits 47 and 127 to sump 128, thereby retracting piston 42 at a relatively slow preselected rate regulated by flow control valve 130. After piston 42 is retracted such that the outside edges of planar surfaces 48 of piston 42 are flush with the bottom surfaces of slide plates 52, as shown in FIG. 5F, limit switch 90 is tripped. In response to the signal from switch 90, controller 142 energizes solenoid drivers 138 and 139 to switch solenoid valve 118 to valve position K thereby introducing pressurized hydraulic fluid through conduits 114 and 62 into the outboard ends of hydraulic cylinders 56 so as to extend slide plates 52. Preferably the setting of flow control valve 130 is selected such that slide plates 52 are extended in coordination with the retraction of piston 42 so as to minimize the disturbance of the bed of solids in vessel 14, i.e., slide plates 52 are extended at a rate which is calculated to sweep the particulate solids off the top of piston 42 while minimizing the uplifting of the bed of particulate solids in vessel 14. When piston 42 has been retracted to piston position E as shown in FIG. 5G, slide valves 52 will have traversed the solids inlet of vessel 14 and limit switches 66 will be tripped. In response to the signal from switches 66, motion sequence controller 142 (1) deenergizes solenoid drivers 138 and 139 to return solenoid valve 118 to valve position J thereby stopping slide plates 52 in the fully extended position, and (2) simultaneously deenergizes solenoid driver 140 to return solenoid valve 126 to valve position L so that hydraulic fluid is displaced more rapidly from the lower end of hydraulic cylinder 46 through conduits 47, 49 and 120 to sump 121, thereby speeding the retraction of piston 42 to piston position A, as shown in FIGS. 5H and 5A. The preferred first embodiment just described includes a bed relaxation step, described more fully herein below, whereby the bed of solids in vessel 14 is relaxed by partial retraction of piston 42 before slide plates 52 are extended.

In alternative embodiments of the feeder cycle wherein upon full extension of piston 42 the top of piston 42 is raised only to piston position E, the use of a bed relaxation step is optional, although still preferred. In a second embodiment having no bed relaxation step, after piston 42 has been extended to position E limit switch 88 is tripped and in response to the signal from switch 88, motion sequence controller 142 (1) deenergizes solenoid driver 136 and 137 to return solenoid valve 116 to valve position G thereby holding piston 42 in piston position E, and (2) simultaneously energizes solenoid drivers 138 and 139 to switch solenoid valve 118 to valve position K thereby extending slide plates 52, as shown in FIG. 5G. Upon full extension of slide plates 52, limit switches 66 are tripped, and in response to the signal from switches 66, motion sequence controller 142 (1) deenergizes solenoid drivers 138 and 139 to return solenoid valve 118 to valve position J thereby holding slide plates 52 stationary in the fully extended position, and (2) simultaneously energizes solenoid drivers 136 and 137 to switch solenoid valve 116 to valve position F thereby retracting piston 42 until the top surface of piston 42 is returned to piston position A as shown in FIGS. 5H and 5A. Obviously in this just-described embodiment, limit switch 90, conductor 100, valves 126 and 140, conduit 127 and sump 128 are not required.

In a third embodiment of the feeder cycle, piston 42 is extended only to piston position E and a bed relaxation step is incorporated into the feeder cycle. Upon extension of piston 42 to piston position E, limit switch 88 is tripped and, in response to the signal from switch 88, motion sequence controller 142 simultaneously energizes solenoid drivers 136 and 137 to switch solenoid valve 116 to valve position F and energizes solenoid driver 140 to switch solenoid valve 126 to valve position M. As a result, pressurized hydraulic fluid is introduced through conduits 112 and 45 into the upper end of hydraulic cylinder 46 while hydraulic fluid is displaced from the lower end of cylinder 46 through conduits 47 and 127 to sump 128, thereby retracting piston 42 at a relatively slow preselected rate regulated by flow control valve 130. After piston 42 is retracted a short preselected distance from position E so as to relax the bed of solids in vessel 14, limit switch 90 is tripped. In response to the signal from switch 90, controller 142 energizes solenoid drivers 138 and 139 to switch valve 118 to valve position K so that pressurized hydraulic fluid is introduced through conduits 114 and 62 into the outboard ends of hydraulic cylinder 56 thereby extending slide plates 52. Optionally, in response to the signal from switch 90, controller 142 can deenergize solenoid drivers 136 and 137 to switch solenoid valve 116 to valve position G thereby temporarily halting the retraction of piston 42 until slide plates 52 are fully extended, at which time limit switches 66 would be tripped and controller 142 would reenergize solenoid drivers 136 and 137 to return solenoid valve 116 to valve position F so as to resume retraction of piston 42. Preferably, however, piston 42 is allowed to retract slowly as slide plates 52 are being extended. When slide plates 52 are fully extended, limit switches 66 are tripped and controller 142 (1) deenergizes solenoid drivers 138 and 139 to return valve 118 to valve position J thereby holding slide plates 52 stationary in the fully extended position, and (2) simultaneously deenergizes solenoid driver 140 to switch solenoid valve 126 to valve position L, thereby speeding the rate of retraction of piston 42 to piston position A, as shown in FIG. 5H.

In the method of this invention, particulate solids are transported by mechanically unassisted gravity flow from an elevated solids feed reservoir into a stationary feed cylinder below and in coaxial alignment with a bottom solids inlet of a solids upflow vessel. A piston adapted for vertical reciprocation within the feed cylinder is extended to displace particulate solids from the feed cylinder upwardly through the solids inlet into the solids upflow vessel. Thereafter a solids backflow prevention device is activated to prohibit backflow of the solids from the solids upflow vessel and then the piston is retracted to allow the introduction of additional particulate solids into the feed cylinder by gravity flow from the feed reservoir.

Various feeder cycles can be employed in the method of this invention. Preferably the feeder cycle includes a bed relaxation step wherein, after full extension of the piston, the piston is partially retracted a preselected distance from its fully extended position before the backflow prevention device is activated. It has been discovered that this partial retraction of the piston causes the bed of particulate solids to "relax" and thereby substantially reduce the piston-to-solids pressure after relaxation and the solids loading pressure on the backflow prevention device. By proper selection of the distance by which the piston is partially retracted, the piston-to-solids pressure after relaxation can be reduced to about bin loading pressure or less. Surprisingly the bed relaxation step also reduces the maximum piston-to-solids pressure during the pumping stroke, such as by 25 percent or more. These reductions in pressure result in substantial benefits in terms of reduced size and weight of the equipment required and reduced power consumption.

The distance by which the piston is retracted during the bed relaxation step is selected in view of, inter alia, the configuration of the solids upflow vessel, the diameter of the feed piston, the type and thickness of the backflow prevention device, and the compressibility and other characteristics of the particulate solids to be introduced into the solids upflow vessel. Alternatively, the solids feeder design can be selected in view of the solids to be transported and the reduced pressures achieved with the bed relaxation step so as to optimize the design of the apparatus.

The distance between the fully extended piston position and the piston position after the bed relaxation step is selected to reduce the piston-to-solids pressure after bed relaxation to a desired pressure less than the maximum piston-to-solids pressure during the charging stroke of the feeder cycle, such as bin loading pressure or less. As used herein, the term "bin loading pressure" is defined as the steady state solids loading pressure on the bottom support of a bed of particulate solids which is free from externally applied pressures. Preferably the piston is partially retracted at least a distance of about 0.02 times the diameter of the piston, more preferably between about 0.03 and about 0.2 times the diameter of the piston. Good results are obtained when the piston is partially retracted a distance between about 0.05 and about 0.1 times the diameter of the piston during the bed relaxation step.

In one embodiment of the method of this invention, the feeder cycle involves reciprocating the piston between three piston positions as follows: a first piston position in which the piston is fully retracted to allow particulate solids to be introduced by gravity flow into the feed cylinder; a second piston position in which the piston has been extended until the charge of particulate solids in the feed cylinder fills substantially all of the volume of the feed cylinder between the backflow prevention device and the piston, and a third piston position in which the top surface of the piston is substantially flush with the top of the feed cylinder and just below the bottom of the backflow prevention device. This feeder cycle does not employ a bed relaxation step. During the feeder cycle, after particulate solids have been introduced into the feed cylinder, the piston is extended from the first piston position to the second piston position while the backflow prevention device prohibits backflow of solids from the solids upflow vessel. Then the backflow prevention device is deactivated and the piston is extended to the third piston position thereby displacing all the particulate solids from the feed cylinder into the solids upflow vessel. Thereafter the backflow prevention device is reactivated and the piston is retracted to the first piston position to allow the introduction of additional solids into the feed cylinder.

In a second embodiment of the invention, the feeder cycle involves reciprocating the piston between four piston positions including the three piston positions just described with respect to the first embodiment and a fourth piston position located a preselected distance below the third piston position in the feed cylinder between the third and second piston positions. During this second feeder cycle, after particulate solids have been introduced into the feed cylinder, the piston is extended from the first piston position to the second piston position while the backflow prevention device prohibits backflow of solids from the solids upflow vessel. Then the backflow prevention device is deactivated and the piston is extended to the third piston position thereby displacing all the particulate solids from the feed cylinder into the solids upflow vessel. Thereafter the piston is partially retracted to the fourth piston position so as to relax the bed of solids in the solids upflow vessel. The backflow prevention device is then activated to prohibit backflow of solids from the solids upflow vessel and the piston is retracted to allow additional particulate solids to be introduced by gravity flow into the feed cylinder. This second embodiment includes a bed relaxation step.

Figure 5B:
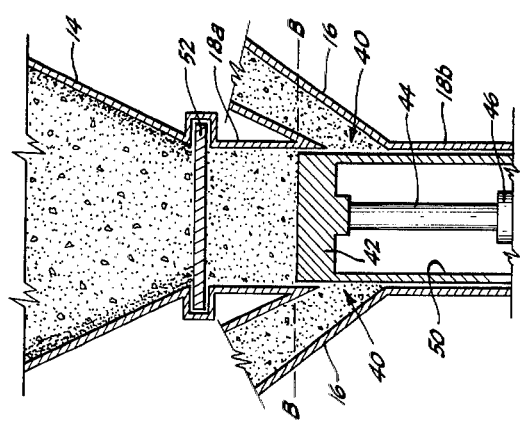
Figure 5C:
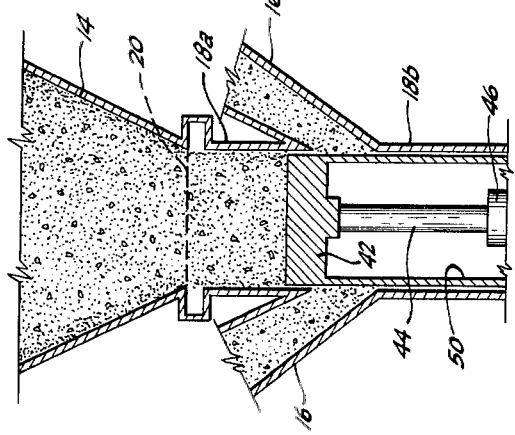
Figure 5D:
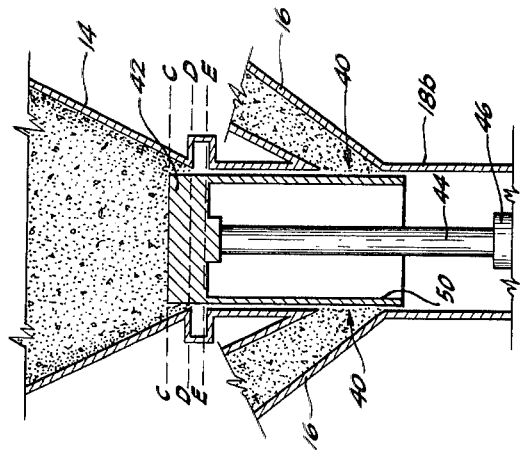
Figure 5E:
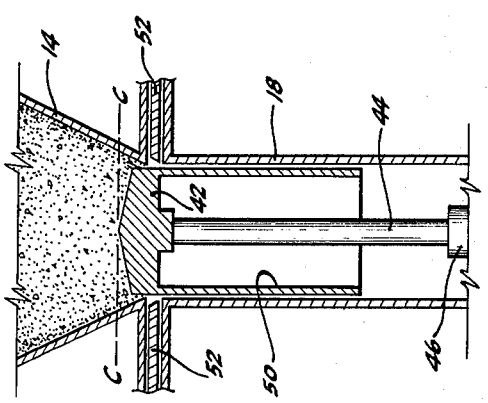
Figure 5F:
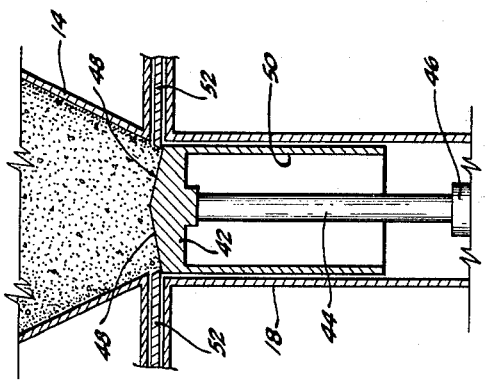
Figure 5G:
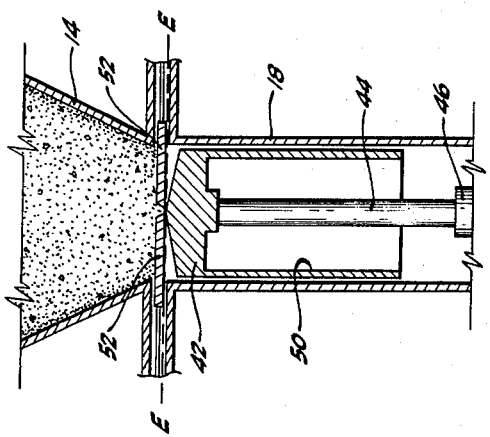
Figure 5H:
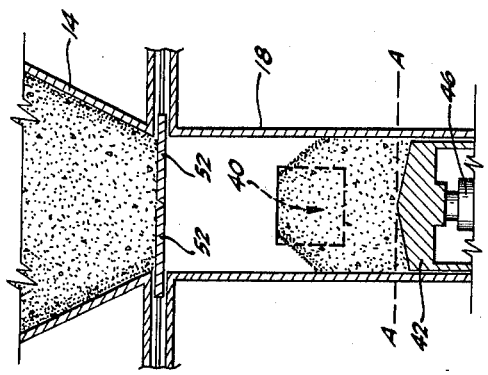

In the particularly preferred embodiment of the method of this invention illustrated in FIGS. 5A through 5H, the feeder cycle involves reciprocating piston 42 between four piston positions as follows: piston position A as shown in FIGS. 5A and 5H in which piston 42 is fully retracted to allow particulate solids to be introduced by mechanically unassisted gravity flow through feed chute 16 and opening 40 into section 18b of feed cylinder 18; piston position B as shown in FIG. 5B in which piston 42 has been extended until the charge of particulate solids in feed cylinder 18 fills substantially all of section 18a of feed cylinder 18 between slide plates 52 and piston 42, and skirt element 50 is raised into sealing relationship with openings 40; piston position C as shown in FIGS. 5D and 5E in which the top surface of piston 42 is above the top of slide plates 52 (as indicated by dashed line D) and within an expanding inlet section of vessel 14; and piston position E as shown in FIG. 5G in which the top surface of piston 42 is substantially flush with the top of feed cylinder 18 and just below the bottom of slide plates 52.

During this preferred feeder cycle, particulate solids are introduced by gravity flow through feed chutes 16 and openings 40 while slide plates 52 prevent backflow of solids from vessel 14 and piston 42 is in piston position A, as shown in FIGS. 5A and 5H. The solids fall freely into section 18b of feed cylinder 18 as soon as openings 40 become unrestricted by the retraction of piston 42. The amount of solids introduced into section 18b is naturally regulated by the natural angle of repose of the solids and the volume of feed cylinder 18 between the top of openings 40 (as indicated by dashed line 19) and the top of piston 42. Thus to increase or decrease the amount of solids introduced during each feeder cycle, the position of piston position A need only be lowered or raised, respectively, with appropriate modifications in the placement of limit switches 92 and 94 as shown in FIGS. 3 and 4. Preferably the volume of solids introduced into feed cylinder 18 during the feeder cycle is approximately equal to or slightly smaller than the volume of section 18a of feed cylinder 18.

After the charge of solids has been introduced into feed cylinder 18 as shown in FIGS. 5A and 5H, piston 42 is extended by means of hydraulic cylinder 46 and shaft 44 to piston position B, as shown in FIG. 5B. In this position, the charge of solids substantially completely fills the volume of section 18a of feed cylinder 18 between slide plates 52 and piston 42. While it is undesirable to extend piston 42 so as to crush the solids against the bottom of slide plates 52, it is desirable to minimize the amount of void space between the solids charge and slide plates 52 so as to reduce to a practical minimum the fall-back of the bed of solids from vessel 14 upon retraction of slide plates 52. Thereafter slide plates 52 are retracted to communicate feed cylinder 18 with vessel 14 as shown in FIG. 5C. Piston 42 is then extended to piston position C thereby displacing the particulate solids from feed cylinder 18 into vessel 14 as shown in FIGS. 5D and 5E.

As shown in FIGS. 5E through 5G, piston 42 is then partially retracted from piston position C to piston position E so as to relax the bed of solids in vessel 14 as described above. Piston 42 may be retracted to piston position E before slide plates 52 are extended, in which case piston 42 is maintained in piston position E until slide plates 52 are fully extended. Preferably however, piston 42 is retracted only a preselected portion of the distance to piston position E before slide plates 52 are extended. This preselected portion is preferably the distance required to relax the bed of solids in vessel 14, and the remaining distance to piston position E is preferably that distance required for piston 42 to vacate a volume equal to the volume of slide plates 52. As best seen in FIG. 5F, slide plates 52 are preferably extended as piston 42 is retracted such that the leading edge of slide plates 52 sweep planar surfaces 48 of piston 42. In this manner, crushing of the particulate solids between slide plates 52 is minimized and the closing of slide plates 52 results in little, if any, raising of the bed of solids in vessel 14.

After slide plates 52 have been fully extended as shown in FIG. 5G, piston 42 is then fully retracted to piston position A thereby allowing additional particulate solids to flow into feed cylinder 18 as shown in FIGS. 5H and 5A. The stroke length, piston diameter and/or cycle length can be varied to achieve a variety of solids flow rates.

The invention is further illustrated by the following example which is illustrative of a specific mode of practicing the invention and is not intended as limiting the scope of the appended claims.

EXAMPLES

In accordance with this invention and substantially in accordance with the apparatus and method illustrated in the drawings, particulate oil shale having a nominal size range of $\frac{1}{8}$-inch to 2-inches and a Fischer assay of about 41 gallons per ton is transported from elevated solids feed reservoir 12 by mechanically unassisted gravity flow through feed chutes 16 into section 18a of feed cylinder 18 and is introduced upwardly into the bottom of solids upflow vessel 14 at a rate of about 10,000 tons per day by means of piston 42 having a diameter of about 10 feet. Bottom solids inlet 20 of vessel 14 has a diameter of about 10 feet and twin horizontally reciprocable slide plates 52, each having a thickness of about 4-inches, are adapted to selectively prevent solids communication between vessel 14 and feed cylinder 18. Sections 18a of feed cylinder 18 has a height of about 9 feet.

The feeder cycle consists of the consecutive steps of (1) introducing particulate oil shale by mechanically unassisted gravity flow from feed reservoir 12 through feed chutes 16 into section 18a of feed cylinder 18 while slide plates 52 prevent backflow of solids from vessel 14; (2) extending piston 42 from piston position A a distance of about 9 feet to piston position B in which the top surface of piston 42 is about 9 feet below slide plates 52 and just above the top of openings 40, thereby automatically positioning skirt element 50 in sealing relationship with opening 40; (3) fully retracting slide plates 52 to communicate vessel 14 with feed cylinder 18; (4) further extending piston 42 from piston position B a distance of about 9-feet, 10-inches to piston position C in which the top surface of piston 42 is about 6-inches above the top of slide plates 52 and within the expanding inlet section of vessel 14, thereby displacing the oil shale from feed cylinder 18 into vessel 14; (5) partially retracting piston 42 from piston position C a distance of about 10-inches to piston position E thereby relaxing the bed of solids within vessel 14, and, after about 6-inches of this partial retraction, extending slide plates 52 in concert with the remaining retraction of piston 42 to piston position E such that the leading edges of slide plates 52 sweep inclined surfaces 48 of piston 42; and (6) thereafter fully retracting piston 42 to piston position A thereby allowing additional particulate oil shale to be introduced into feed chutes 16. Piston 42 is held in piston position A for a short period to allow adequate time for filling of section 18a of feed cylinder 18. Each cycle of the feeder takes about 3.2 minutes.

While particular embodiments of the invention have been described, it will be understood, of course, that the invention is not limited thereto since many obvious modifications can be made, and it is intended to include within this invention any such modification as will fall within the scope of the appended claims.

Having now described the invention, I claim:

1. An apparatus for introducing particulate solids upwardly into a solids upflow vessel having a bottom solids inlet, which comprises:

a stationary feed cylinder mounted below said upflow vessel in coaxial alignment with said solids inlet, said feed cylinder having a substantially solids-tight upper cylindrical section of a preselected height and a lower cylindrical section having at least one solids inlet opening;

at least one solids feed chute mounted adjacent said upflow vessel and having a discharge end communicating with said feed cylinder through said inlet opening, said feed chute having an inlet end communicating with an elevated feed reservoir and being adapted to transport particulate solids from said feed reservoir into said lower section by mechanically unassisted gravity flow through said feed chute;

a piston movably mounted in said feed cylinder for vertical reciprocation along the common axis of said feed cylinder and said solids inlet;

piston actuator means for reciprocating said piston along said common axis;

backflow prevention means interposed between said feed cylinder and said solids inlet, said backflow prevention means being adapted to prohibit backflow of solids from said upflow vessel during the filling of said feed cylinder and to allow displacement of solids from said feed cylinder upwardly through said solids inlet; and sealing means for sealing the inlet opening of said feed cylinder during the displacement of said solids into said upflow vessel.

2. The apparatus defined in claim 1 wherein said sealing means comprises a skirt element coupled to and extending downwardly from said piston, said skirt element being adapted to be automatically positioned in sealing relationship with said inlet opening upon extension of said piston.

3. The apparatus defined in claim 1 wherein said backflow prevention means comprises (1) one or more slide plates movably mounted immediately below said solids inlet and adapted for reciprocation between a sealing position in which said slide plates traverse said solids inlet to prohibit flow of solids through said solids inlet and an open position in which said solids inlet is unrestricted, and (2) one or more slide plate actuator means for reciprocating said slide plates between said sealing position and said open position.

4. The apparatus defined in claim 3 wherein the top surface of said piston comprises one or more planar surfaces inclined from horizontal at a preselected angle, said angle being selected and said planar surfaces being adapted to cooperate with said slide plates so as to allow extension of said slide plates during the retraction of said piston from its fully extended position without any substantial uplifting of the bed of solids in said solids upflow vessel.

5. The apparatus defined in claim 1 wherein said piston actuator means includes a hydraulically actuated cylinder mounted in axial alignment with said feed cylinder and adapted to actuate a shaft connected to said piston.

6. The apparatus defined in claim 1 further comprising segregation control means mounted in said feed chute for inhibiting the natural size-segregation of solids flowing through said feed chute.

7. The apparatus defined in claim 6 wherein said segregation control means comprises a baffle fixedly mounted longitudinally within a lower, inclined portion of said feed chute so as to divide the interior of said inclined portion into upper and lower solids flow paths.

8. The apparatus defined in claim 1 further comprising control means for synchronizing the movements of said piston with the actuation of said backflow prevention means.

9. An apparatus for transporting particulate solids from an elevated solids feed reservoir and introducing said solids upwardly into a solids upflow vessel having a bottom solids inlet, said apparatus comprising:

a stationary feed cylinder mounted below said upflow vessel in coaxial alignment with said solids inlet, said feed cylinder having a substantially solids-tight upper cylindrical section having a preselected height and a lower cylindrical section having at least one solids inlet opening;

at least one solids feed chute mounted adjacent said upflow vessel and having a discharge end communicating with said feed cylinder through said inlet opening and an inlet end communicating with said feed reservoir, said feed chute being adapted to transport particulate solids from said feed reservoir into said lower section by mechanically unassisted gravity flow through said feed chute;

a piston movably mounted in said feed cylinder for vertical reciprocation among three or more preselected piston positions along the common axis of said feed cylinder and said solids inlet;

a skirt element attached to and extending downwardly from the perimeter of said piston, said skirt element being adapted to be automatically positioned in sealing relationship with said inlet opening upon extension of said piston;

first position indicating means for indicating when said piston occupies each of said preselected piston positions;

a pair of slide plates movably mounted immediately below said solids inlet and above said feed cylinder for substantially horizontal reciprocation in opposite directions between a sealing position in which said slide plates are extended to jointly traverse said solids inlet so as to prohibit solids flow therethrough and an open position in which said slide plates are retracted to allow unrestricted solids flow through said solids inlet;

second position indicating means for indicating when said slide plates occupy each of said open position and said sealing position;

hydraulic means for vertically reciprocating said piston among said piston positions and for horizontally reciprocating said slide plates between said open position and said sealing position; and sequence control means operably connected to said first and second position indicating means and to said hydraulic means for controlling said hydraulic means in response to signals received from said first and second position indicating means so as to synchronize the movements of said piston and said slide plates.

10. The apparatus defined in claim 9 wherein said piston has a chisel-like top surface with two oppositely inclined planar surfaces sloping outwardly and downwardly from a horizontal ridge extending across the diameter of said piston perpendicular to the line of reciprocation of said slide plates.

11. The apparatus defined in claim 9 further comprising a baffle fixedly mounted longitudinally within a lower, inclined portion of said feed chute so as to divide said inclined portion into upper and lower solids flow paths.

12. A method for transporting particulate solids from an elevated solids feed reservoir and introducing said solids upwardly into a solids upflow vessel having a bottom solids inlet, said method comprising:

(a) transporting a charge of particulate solids by mechanically unassisted gravity flow from said feed reservoir downwardly through at least one solids feed chute into a lower cylindrical section of a stationary feed cylinder mounted below and in coaxial alignment with said solids inlet, said feed cylinder being fitted with a piston axially reciprocatable among at least three piston positions along the common axis of said feed cylinder and said solids inlet;

(b) extending said piston from a lowermost first piston position upwardly to a second piston position so as to displace said charge of particulate solids from said lower section upwardly into a substantially solids-tight upper cylindrical section of said feed cylinder;

(c) communicating said upper section of said feed cylinder with said solids inlet;

(d) thereafter further extending said piston upwardly to an uppermost third piston position so as to displace substantially all of said charge of particulate solids upwardly into said solids upflow vessel;

(e) thereafter positioning a backflow prevention element directly below said solids inlet so as to prevent backflow of said solids downwardly through said solids inlet; and (f) retracting said piston to said first piston position.

13. The method defined in claim 12 wherein said steps (a) through (f) are repeated for a plurality of cycles.

14. The method defined in claim 12 wherein said third piston position is that position in which the top of said piston is substantially flush with the top of said feed cylinder.

15. The method defined in claim 14 further comprising the step of, between said steps (d) and (e), partially retracting said piston a preselected distance to a fourth piston position so as to relax the bed of particulate solids in said upflow vessel.

16. The method defined in claim 12 wherein said third piston position is a position in which the top of said piston is a preselected distance above said solids inlet, and wherein said method further comprises the step of, between said steps (d) and (e), partially retracting said piston to a fourth piston position in which the top of said piston is substantially flush with the top of said feed cylinder, thereby relaxing the bed of particulate solids in said solids upflow vessel.

17. The method defined in claim 15 or 16 wherein said preselected distance is selected such that the pressure between said piston and said solids is reduced to about bin loading pressure or less by the partial retraction of said piston.

18. The method defined in claim 15 or 16 wherein said preselected distance is between about 0.03 and about 0.2 times the diameter of said piston.

19. A method for transporting particulate solids from an elevated solids feed reservoir and introducing said solids upwardly into a solids upflow vessel having a bottom solids inlet, said method comprising:

(a) transporting a charge of particulate solids by mechanically unassisted gravity flow from said feed reservoir downwardly through at least one solids feed chute into a lower cylindrical section of a stationary feed cylinder mounted below and in coaxial alignment with said solids inlet, said feed cylinder being fitted with a piston axially reciprocable among at least three piston positions along the common axis of said feed cylinder and said solids inlet;

(b) extending said piston from a lowermost first piston position upwardly to a second piston position so as to displace said charge of particulate solids from said lower section upwardly into a substantially solids-tight upper cylindrical section of said feed cylinder;

(c) communicating said upper section of said feed cylinder with said solids inlet;

(d) thereafter further extending said piston upwardly to an uppermost third piston position in which the top of said piston is substantially flush with the top of said feed cylinder, thereby displacing substantially all of said charge of particulate solids upwardly into said solids upflow vessel;

(e) thereafter interposing a backflow prevention element between said solids inlet and the top of said feed cylinder so as to prevent backflow of said solids downwardly through said solids inlet;

(f) retracting said piston to said first piston position; and (g) repeating said steps (a) through (f).

20. The method defined in claim 19 further comprising the step of, between said steps (d) and (e), partially retracting said piston a preselected distance to a fourth piston position so as to relax the bed of solids in said upflow vessel, said preselected distance being between about 0.03 and about 0.2 times the diameter of said piston.

21. A method for transporting particulate solids from an elevated solids feed reservoir and introducing said solids upwardly into a solids upflow vessel having a bottom solids inlet, said method comprising:

(a) transporting a charge of particulate solids by mechanically unassisted gravity flow from said feed reservoir downwardly through at least one solids feed chute into a lower cylindrical section of a stationary feed cylinder mounted below and in coaxial alignment with said solids inlet, said feed cylinder being fitted with a piston axially reciprocate among four piston positions along the common axis of said feed cylinder and said solids inlet;

(b) extending said piston from a lowermost first piston position upwardly to a second piston position so as to displace said charge of particulate solids from said lower section upwardly into a substantially solids-tight upper cylindrical section of said feed cylinder;

(c) retracting in opposite directions first and second slide plates from a sealing position in which said slide plates jointly traverse said solids inlet to an open position in which said slide plates are retracted to allow unrestricted solids flow through said solids inlet, thereby communicating said feed cylinder with said solids upflow vessel;

(d) thereafter further extending said piston upwardly to an uppermost third piston position in which the top of said piston is a first preselected distance above the top of said feed cylinder and within an expanding inlet section of said solids upflow vessel, thereby displacing said charge of particulate solids upwardly into said solids upflow vessel;

(e) partially retracting said piston to a fourth piston position in which the top of said piston is substantially flush with the top of said feed cylinder so as to relax the bed of particulate solids in said solids upflow vessel and reduce the pressure between said piston and said solids to about bin loading pressure or less;

(f) extending said slide plates into said sealing position;

(g) thereafter retracting said piston to said first piston position; and (h) repeating said steps (a) through (g).

22. The method defined in claim 21 wherein said first preselected distance is between about 0.03 and about 0.2 times the diameter of said piston.

23. The method defined in claim 21 wherein said piston has a chisel-like top surface with two oppositely inclined planar surfaces sloping downwardly and outwardly from a horizontal ridge extending across the diameter of said piston perpendicular to the line of reciprocation of said slide plates, and wherein said slide plates are extended in step (f) so as to sweep said planar surfaces during the partial retraction of said piston in said step (e).

24. The method defined in claim 23 wherein said first preselected distance is equal to the sum of the thickness of said slide plates and a second preselected distance between about 0.03 and about 0.2 times the diameter of said piston, and wherein the extension of said slide plates to sweep said planar surfaces begins after said piston has been retracted said second preselected distance from said third piston position.

* * * * *

UNITED STATES PATENT AND TRADEMARK OFFICE
CERTIFICATE OF CORRECTION

PATENT NO. : 4,295,773
DATED : October 20, 1981
INVENTOR(S) : ROLAND O. DHONDT

It is certified that error appears in the above–identified patent and that said Letters Patent are hereby corrected as shown below:

In Column 18, lines 16 and 17, in Claim 21, the word "reciprocate" should read --reciprocatable--.

Signed and Sealed this

Thirtieth Day of March 1982

[SEAL]

Attest:

GERALD J. MOSSINGHOFF

Attesting Officer

Commissioner of Patents and Trademarks